(12) United States Patent
Matsumoto et al.

(10) Patent No.: US 11,870,893 B2
(45) Date of Patent: Jan. 9, 2024

(54) SECURE COMPUTING METHOD, SECURE COMPUTING SYSTEM, AND SECURE COMPUTING MANAGEMENT DEVICE

(71) Applicant: KABUSHIKI KAISHA TOSHIBA, Tokyo (JP)

(72) Inventors: Mari Matsumoto, Kawasaki (JP); Masanori Furuta, Odawara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 108 days.

(21) Appl. No.: 17/469,106

(22) Filed: Sep. 8, 2021

(65) Prior Publication Data
US 2022/0255730 A1 Aug. 11, 2022

(30) Foreign Application Priority Data

Feb. 10, 2021 (JP) ................................. 2021-020031

(51) Int. Cl.
*H04L 9/08* (2006.01)
*G06N 5/04* (2023.01)
(Continued)

(52) U.S. Cl.
CPC ............ *H04L 9/085* (2013.01); *G06F 21/606* (2013.01); *G06N 3/088* (2013.01); *G06N 5/04* (2013.01)

(58) Field of Classification Search
None
See application file for complete search history.

(56) References Cited

U.S. PATENT DOCUMENTS 10,630,655 B2 * 4/2020 Becker ................ H04L 63/0457
10,679,522 B2 * 6/2020 Ikarashi .................... G09C 1/00
(Continued)

FOREIGN PATENT DOCUMENTS

EP  3 863 002 A1  8/2021
EP  3 866 142 A1  8/2021
(Continued)

OTHER PUBLICATIONS

Graepel, T., Lauter, K., Naehrig, M. (2013). ML Confidential: Machine Learning on Encrypted Data. In: Kwon, T., Lee, MK., Kwon, D. (eds) Information Security and Cryptology—ICISC 2012. ICISC 2012. Lecture Notes in Computer Science, vol. 7839. (Year: 2012).*

(Continued)

*Primary Examiner* — Saleh Najjar
*Assistant Examiner* — Shadi H Kobrosli
(74) *Attorney, Agent, or Firm* — Oblon, McClelland, Maier & Neustadt, L.L.P.

(57) ABSTRACT

According to one embodiment, a secure computing method includes setting a coefficient selected from a ring of integers Q based on first data X, generating n pieces of first fragment data from the first data X based on the coefficient, causing a learning model held in the computing device to learn the first fragment data, generating n pieces of second fragment data from second data Z based on the coefficient, performing, by each of the n computing devices, inference based on the second fragment data using the learning model, and obtaining decoded data dec by decoding k pieces of inference result data. The coefficient is set to make each of the n pieces of first fragment data less than a maximum value of the ring of integers Q.

10 Claims, 6 Drawing Sheets

(51) Int. Cl.
   *G06N 3/088*   (2023.01)
   *G06F 21/60*   (2013.01)

(56) References Cited

U.S. PATENT DOCUMENTS

| | | | |
|---|---|---|---|
| 11,582,203 B2 * | 2/2023 | Storm | H04L 63/0428 |
| 2023/0032519 A1 * | 2/2023 | Chandran | G06N 3/08 |

FOREIGN PATENT DOCUMENTS

| | | | |
|---|---|---|---|
| KR | 20210081471 A * | 12/2019 | |
| WO | WO 2020/071441 A1 | 4/2020 | |
| WO | WO 2020/075797 A1 | 4/2020 | |

OTHER PUBLICATIONS

M. Sadegh Riazi, Christian Weinert, Oleksandr Tkachenko, Ebrahim M. Songhori, Thomas Schneider, Farinaz Koushanfar; Chameleon: A Hybrid Secure Computation Framework for Machine Learning Applications; 707-721 (Year: 2018).*

Xiling Li, Rafael Dowsley, Martine De Cock; Privacy-Preserving Feature Selection with Secure Multiparty Computation; 1-11 (Year: 2021).*

Alessandro Baccarini and Marina Blanton and Chen Yuan; Multi-Party Replicated Secret Sharing over a Ring with Applications to Privacy-Preserving Machine Learning; Cryptology ePrint Archive (Year: 2020).*

Dalskov, Anders Peter Kragh.; Cats or Croissants? Techniques for Secure Inference. Aarhus University 2020. 1-151 (Year: 2020).*

Damgard et al.; New Primitives for Actively-Secure MPC over Rings with Applications to Private Machine Learning; 1-19 (Year: 2019).*

Fabian Boemer, Rosario Cammarota, Daniel Demmler, Thomas Schneider, and Hossein Yalame. 2020. MP2ML: A Mixed-Protocol Machine Learning Framework for Private Inference. In Proceedings of the 2020 Workshop on Privacy-Preserving Machine Learning in Practice (PPMLP'20). (Year: 2020).*

* cited by examiner

SECURE COMPUTING METHOD, SECURE COMPUTING SYSTEM, AND SECURE COMPUTING MANAGEMENT DEVICE

CROSS-REFERENCE TO RELATED APPLICATIONS

This application is based upon and claims the benefit of priority from Japanese Patent Application No. 2021-020031, filed Feb. 10, 2021, the entire contents of which are incorporated herein by reference.

FIELD

Embodiments described herein relate generally to a secure computing method, a secure computing system, and a secure computing management device.

BACKGROUND

In recent years, various types of information have been digitized, and advanced telecommunication services using such information have been provided. Such telecommunication services include various services such as a service for detecting, based on information obtained from a sensor installed in a device or the like in a factory, an abnormality in the device (that is, predicting a failure) and a service that matches user's preference based on user's personal data (personal information).

By the way, in order to make such services available, it is conceivable to use (a learning model built by) machine learning. The scale of machine learning is on the increase, and in recent years, computation (calculation) related to machine learning tends to be outsourced to a contractor providing a cloud computing service (hereinafter, referred to as a cloud service provider) to perform large-scale machine learning.

When computation related to machine learning is outsourced to such a cloud service provider, there is a risk of leakage of learning data for use in machine learning.

On the other hand, secure computing technology by which computation is performed with the above-described learning data (input data) kept secret is under study. Note that one example of the secure computing technology is secret sharing by which it is possible to perform machine learning with the learning data distributed to a plurality of computing devices, and secret sharing can reduce a risk of leakage of the learning data.

Here, in order to provide the above-described various services, inference (computation) is performed by inputting, to a learning model built by machine learning, data (hereinafter, referred to as inference data) for use in providing the services, and processing based on inference result data obtained as a result of the inference is performed. In a case where machine learning is performed with the learning data distributed to the plurality of computing devices as described above, even at the time of providing such services, the plurality of computing devices perform inference with inference data distributed to the plurality of computing devices, like the above-described learning data, and in this case, it is required that inference result data obtained by the plurality of computing devices be decoded.

When the accuracy of decoding of the inference result data is low, it is difficult to provide a high-quality service.

DETAILED DESCRIPTION

In general, according to one embodiment, a secure computing method to be performed by a secure computing system including a secure computing management device and n computing devices, where n is an integer equal to or greater than two, communicatively coupled to the secure computing management device, is provided. The secure computing method includes setting a coefficient selected from a ring of integers Q with X∈Q based on first data X input to the secure computing management device, performing secret sharing on the first data X and generating n pieces of first fragment data, each associated with a corresponding one of the n computing devices, from the first data X based on the set coefficient, causing, by each of the n computing devices, a learning model held in the computing device to learn the first fragment data associated with the computing device, performing secret sharing on the second data Z and generating n pieces of second fragment data, each associated with a corresponding one of the n computing devices, from second data Z input to the secure computing management device based on the set coefficient, performing, by each of the n computing devices, inference based on the second fragment data associated with the computing device using the learning model held in the computing device, and obtaining decoded data dec by decoding k pieces of inference result data obtained as a result of inference performed by each of k computing devices among the n computing devices, where k is an integer equal to or greater than two and equal to or less than n. The coefficient is set to make each of the n pieces of first fragment data less than a maximum value of the ring of integers Q.

Various embodiments will be described hereinafter with reference to the accompanying drawings.

First Embodiment

Figure 1:
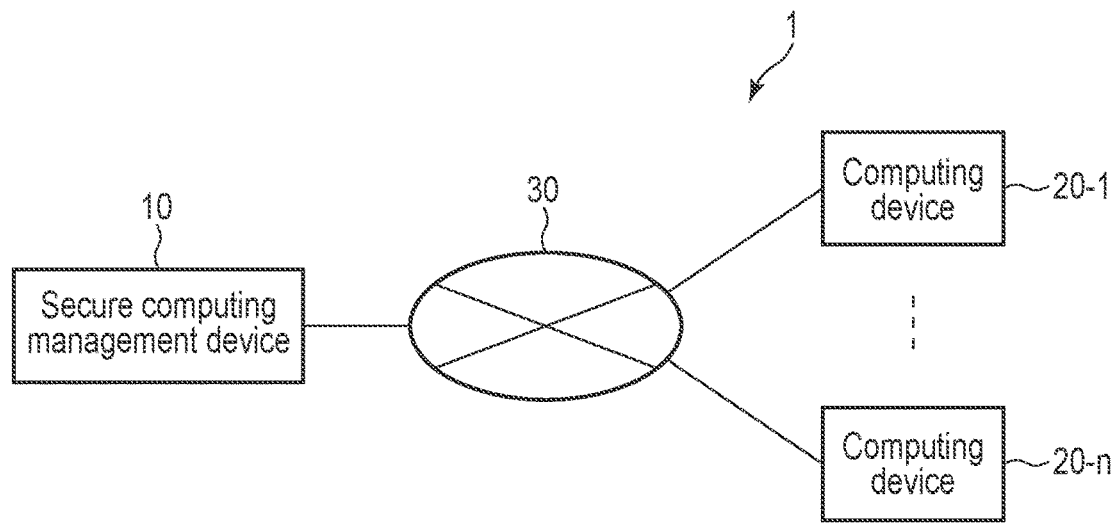
FIG. 1 is a diagram illustrating an example of a network configuration of a secure computing system according to a first embodiment.

First, a description will be given of a first embodiment. FIG. 1 illustrates an example of a network configuration of a secure computing system according to the first embodiment.

As illustrated in FIG. 1, a secure computing system 1 includes a secure computing management device 10 and a plurality of computing devices (calculation devices) 20-1 to 20-$n$ ($n$ is an integer equal to or greater than two). The secure computing management device 10 and the plurality of computing devices 20-1 to 20-$n$ are communicatively coupled over a network 30 such as the Internet.

The secure computing management device 10 is implemented by, for example, an electronic device (information processing device) such as a personal computer, or may be implemented by a different electronic device.

Each of the plurality of computing devices 20-1 to 20-$n$ is implemented by, for example, an electronic device (information processing device) such as a personal computer, or may be implemented by a different electronic device. Note that the plurality of computing devices 20-1 to 20-$n$ may be implemented as, for example, a cloud server device that provides a cloud computing service to the secure computing management device 10.

A brief description will be given below of a usage mode of the secure computing system 1 according to the present embodiment. The secure computing system 1 according to the present embodiment is used to provide various services using a learning model built by machine learning. The services provided by the secure computing system 1 include, for example, a service for detecting, based on data (sensor data) obtained from a sensor installed in a device or the like in a factory, an abnormality in the device, or may include a different service.

According to the present embodiment, it is assumed that machine learning (learning processing) for a learning model for use in providing the above-described services is outsourced to an outsourcing contractor.

The learning data, however, is valuable data in many cases, and there is a risk of leakage of the learning data when the learning processing is outsourced to such an outsourcing contractor. Therefore, the secure computing system 1 according to the present embodiment causes the computing devices 20-1 to 20-$n$ (namely, a plurality of contractors) to perform the learning processing with the learning data kept secret. In this case, each of the computing devices 20-1 to 20-$n$ holds a learning model built as a result of the learning processing performed by the computing device.

Further, as described above, even when an abnormality in a device is detected from, for example, sensor data by using the learning model held in each of the computing devices 20-1 to 20-$n$ (that is, inference is performed), it is possible to realize a service such as abnormality detection by causing the computing devices 20-1 to 20-$n$ to perform inference with the sensor data (inference data) kept secret and decoding an inference result data obtained as a result of the inference.

By the way, technologies for keeping data secret as described above (secure computing technology) include homomorphic encryption and secret sharing, but in general, the homomorphic encryption is higher in computational complexity (calculation complexity) than the secret sharing. Therefore, the secret sharing is used as a secure computing technology applied to the present embodiment.

The secret sharing is a scheme for converting data to be kept secret (confidential information) into a plurality of pieces of fragment data, called shares, and as an example of the secret sharing, Shamir's secret sharing and the like are known.

A description will be given below of an outline of Shamir's secret sharing. Here, a case where a holder of data $a$ to be kept secret is responsible for splitting the data $a$ into $n$ pieces in a secure manner will be given below.

In such a case, according to Shamir's secret sharing, the data holder selects a field (ring of integers) Q with a $\in$ Q and performs secret sharing.

Specifically, $r_1, \ldots, r_k-1$, which are k–1 random elements of the field Q (k is an integer equal to or greater than two and equal to or less than n), are selected, and the following expression (1), which is a polynomial of degree k–1 with the data $a$ to be kept secret as an intercept, is constructed.

$$W(P) = \Sigma_{i=1}^{k-1} r_i P^i + a \quad \text{Expression (1)}$$

Further, $P_1, \ldots, P_n$, which are n elements of the field Q, are selected, and $P_1, \ldots, P_n$ are individually applied to P of the above-described expression (1) to obtain $W(P_1), \ldots, W(P_n)$. Note that $r_1, \ldots, r_k-1$ and $P_1, \ldots, P_n$ described above are coefficients in the expression (1). Further, $P_1, \ldots,$ and $P_n$ represent different values. In other words, $P_t$ (t=1, n) is different from $P_t'$ (t'=1, 2, . . . , n, and t t').

$W(P_1), \ldots, W(P_n)$ obtained as described above are shares (fragment data) of the above-described data $a$ to be kept secret and are transmitted to, for example, n servers or the like different from each other.

This allows the data $a$ to be kept secret to be distributed to and stored in the n servers in a secure manner. Note that when the n servers are denoted as servers $S_1, \ldots, S_n$, and a share transmitted to a server $S_t$ (t=1, n) is denoted as $W(P_t)$, $W(P_t)$ is expressed as, for example, $[a]_t := W(P_t)$.

Next, a case where the above-described data $a$ is reconstructed from the n shares distributed as described above will be given below. In this case, k servers (hereinafter, referred to as servers $S_{t1}, \ldots, S_{tk}$) are selected from among the above-described n servers $S_1, \ldots, S_n$, and the share is received from each of the servers $S_{t1}, \ldots, S_{tk}$ thus selected. Note that the shares received from the servers $S_{t1}, \ldots S_{tk}$ are denoted as $[a]_{t1}, \ldots, [a]_{tk}$.

In this case, the above-described data $a$ can be reconstructed from the above-described k shares $[a]_{t1}, \ldots, [a]_{tk}$ by the following expression (2).

$$a = \Sigma_{j=1}^{k} \lambda_{tj} [a]_{tj} \quad \text{Expression (2)}$$

Note that $\lambda_{tj}$ in the expression (2) is Lagrange coefficient for Lagrange interpolation.

As described above, according to Shamir's secret sharing, it is possible to generate n shares (fragment data) from one piece of data $a$ to be kept secret, distribute the n shares to n servers (devices) to manage the shares in a distributed manner, and collect predetermined k shares from the shares thus distributed to reconstruct the original data $a$. That is, Shamir's Secret Sharing has, for integers n and k that are equal to or greater than two and satisfy k≤n, both loss resistance that allows the original data $a$ to be reconstructed even when n–k shares are lost and confidentiality that prevents the original data $a$ from being reconstructed from less than k shares.

The application of such secure computing to the present embodiment allows learning data to be split into n shares and allows a learning model held in each of n computing devices to learn on a corresponding one of the n shares, and further allows inference data to be split into n shares and allows each of the n computing devices to perform inference using the learning model.

Here, as described above, the secure computing (secret sharing) for computation using shares needs to be performed on a ring of integers. In other words, the above-described data $a$ to be kept secret, the shares $W(P_1), \ldots, W(P_n)$, and the like are all expressed by integers.

As described above, according to the present embodiment, inference using the learning model held in each of the n computing devices 20-1 to 20-$n$ is performed, and k pieces of inference result data obtained as a result of the inference are decoded, and it is required that the inference using the learning model need computation using a real number. When the result of such inference (inference result data) is decoded under the secure computing, an accuracy of the decoding may be lower. Specifically, when the use of a real number for the inference causes inference result data exceeding the field Q (finite field) under the secure computing to be obtained, the inference result data cannot be correctly decoded.

Therefore, according to the present embodiment, a configuration is employed where the accuracy of decoding of the inference result data is made higher by setting a limit on ranges of the coefficients $r_1, \ldots, r_k-1$ and $P_1, \ldots, P_n$ used in the above-described expression (1). Specifically, according to the above-described Shamir's secret sharing, $r_1, \ldots, r_k-1$, which are k−1 random elements of the field Q, and $P_1, \ldots, P_n$, which are n random elements of the field Q, are simply selected as coefficients. On the other hand, according to the secure computing (secret sharing) of the present embodiment, for example, coefficients $r_1, \ldots, r_k-1$ and $P_1, \ldots, P_n$ are set such that $W(P_1), \ldots, W(P_n)$ (that is, fragment data) are each less than a maximum value of the field Q.

Note that, for example, assuming that $P_1, \ldots, P_n$ have a relationship $P_1 < \ldots < P_n$, and the maximum value of the data a to be kept secret is denoted as $A_{max}$, the share $W(P_n)$, which is the maximum value of the shares of $A_{max}$, is expressed by the following expression (3).

$$W(Pn) = \Sigma_{i=1}^{k-1} r_i P_n^i + A_{max} \qquad \text{Expression (3)}$$

According to the present embodiment, the coefficients are set such that the share $W(P_n)$ obtained by such an expression (3) is less than the maximum value of the field Q (that is, $W(P_n) < Q$).

Figure 2:
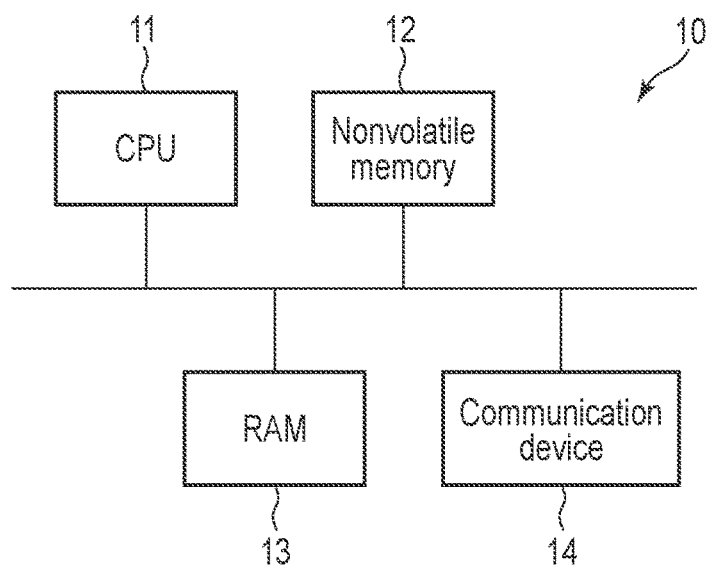
FIG. 2 is a diagram illustrating an example of a hardware configuration of a secure computing management device.

A detailed description will be given below of the secure computing system according to the present embodiment. FIG. 2 illustrates an example of a hardware configuration of the secure computing management device 10 illustrated in FIG. 1.

As illustrated in FIG. 2, the secure computing management device 10 includes a CPU 11, a nonvolatile memory 12, a RAM 13, a communication device 14, and the like.

The CPU 11 is a processor configured to control how various components included in the secure computing management device 10 operate. The CPU 11 may be a single processor or may include a plurality of processors. The CPU 11 runs various programs loaded from the nonvolatile memory 12 to the RAM 13. Such programs include an operating system (OS) and various application programs. The application programs to be run on the CPU 11 as described above includes a program for performing processing related to the above-described secure computing.

The nonvolatile memory 12 is a storage medium used as a secondary storage device. The RAM 13 is a storage medium used as a primary storage device. Although only the nonvolatile memory 12 and the RAM 13 are illustrated in FIG. 2, the secure computing management device 10 may include a different storage device such as a hard disk drive (HDD) or a solid state drive (SSD).

The communication device 14 is a device configured to establish communication with a device (for example, the computing devices 20-1 to 20-$n$) located outside the secure computing management device 10.

Although the hardware configuration of the secure computing management device 10 has been described, the computing devices 20-1 to 20-$n$ are similar in hardware configuration to the secure computing management device 10. Note that no detailed description of the hardware configuration of the computing devices 20-1 to 20-$n$ will be given below.

Figure 3:
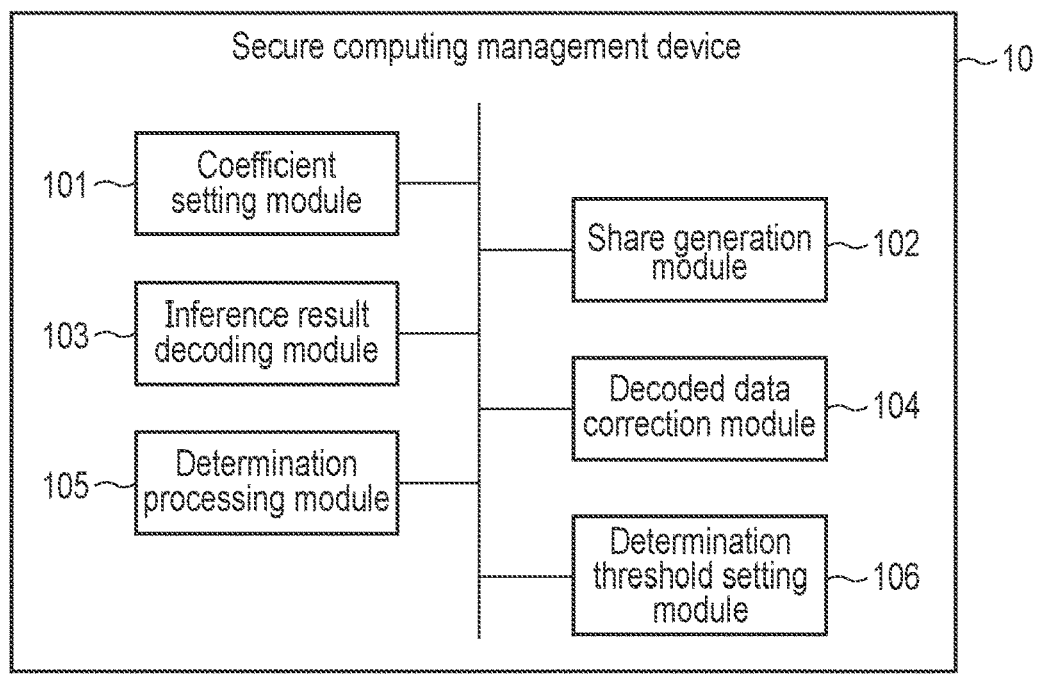
FIG. 3 is a block diagram illustrating an example of a functional configuration of the secure computing management device.

FIG. 3 is a block diagram illustrating an example of a functional configuration of the secure computing management device 10. As illustrated in FIG. 3, the secure computing management device 10 includes a coefficient setting module 101, a share generation module 102, an inference result decoding module 103, a decoded data correction module 104, a determination processing module 105, and a determination threshold setting module 106.

According to the present embodiment, some or all of the modules 101 to 106 included in the secure computing management device 10 are implemented via a predetermined program run on the CPU 11 (namely, a computer of the secure computing management device 10), that is, via software. Note that the program to be run on the CPU 11 may be stored in a computer-readable storage medium and distributed, or may be downloaded to the secure computing management device 10 over a network.

The above description has been given based on the assumption that each of the modules 101 to 106 is implemented via the predetermined program run on the CPU 11, but some or all of the modules 101 to 106 may be implemented via hardware such as an integrated circuit (IC) or via a combination of software and hardware.

A description will be given below of the present embodiment based on the assumption that learning data (group) X is input to the secure computing management device 10 to cause the learning model held in each of the n computing devices 20-1 to 20-$n$ to learn, and inference data Z is input to the secure computing management device 10 to perform inference using the learning model held in each of the n computing devices 20-1 to 20-$n$ as described above. Note that when the secure computing system 1 according to the present embodiment is used to provide a service for detecting an abnormality in a device as described above, the learning data X and the inference data Z are, for example, sensor data obtained from a sensor installed in the device.

When the learning data X is input to the secure computing management device 10, the coefficient setting module 101 sets, based on the learning data X, a coefficient selected from the field (ring of integers) Q with $X \in Q$. Note that when the learning data X is distributed to the n computing devices 20-1 to 20-$n$, n shares are generated from the learning data X as described above, and the coefficient setting module 101 sets a coefficient that makes each of the n shares (that is, the maximum value of the shares) less than the maximum value of the field Q.

The share generation module 102 performs secret sharing on the learning data X to generate n shares (fragment data), each associated with a corresponding one of the n computing devices 20-1 to 20-$n$, from the learning data X based on the coefficient set by the coefficient setting module 101.

When the inference data Z is input to the secure computing management device 10, the share generation module 102 performs secret sharing on the inference data to generate n shares (fragment data), each associated with a corresponding one of the n computing devices 20-1 to 20-$n$, from the inference data Z. Note that the n shares in this case are generated based on the coefficient set, by the coefficient setting module 101, based on the learning data X as described above.

Each of the n shares generated by the share generation module 102 is transmitted to a corresponding one of the computing devices 20-1 to 20-$n$.

The inference result decoding module 103 receives, from k computing devices among the computing devices 20-1 to 20-$n$, k pieces of inference result data obtained as a result (inference result) of inference performed by the k computing devices and decodes the k pieces of inference result data into decoded data.

The decoded data correction module 104 corrects the decoded data obtained by the inference result decoding module 103. Note that the decoded data is corrected based on, for example, (the maximum value of) the field Q under the secure computing. Here, it is assumed that the learning model held in each of the above-described computing devices 20-1 to 20-$n$ is, for example, an auto encoder. The auto encoder is, for example, a learning model trained to output data (output data) that is a reconstruction of data (input data) input to the auto encoder. Note that the auto encoder is, for example, a neural network having a three-layer structure in which nodes (input nodes) included in an input layer is equal in number to nodes (the number of output nodes) included in an output layer, and nodes (hidden nodes) included in a hidden layer is smaller in number than the input layer and the output layer. Note that the number of nodes included in the hidden layer, the number of hidden layers, and the like may be set as appropriate. Further, it is assumed that the same initial configurations (the number of input/output nodes, the number of hidden nodes, the number of hidden layers, and the like) are applied to the learning model held in each of the computing devices 20-1 to 20-$n$.

As described above, when the learning model held in each of the computing devices 20-1 to 20-$n$ is an auto encoder, the determination processing module 105 compares an error value (difference) between the inference data and the decoded data with a threshold to determine a degree of divergence between the inference data and the decoded data. Specifically, when the error value is equal to or greater than the threshold, the determination processing module 105 determines that the inference data and the decoded data are not the same. On the other hand, when the error value is less than the threshold, the determination processing module 105 determines that the inference data and the decoded data are the same. According to the present embodiment, it is possible to detect, for example, whether a device is under an abnormal condition based on such a result of the determination made by the determination processing module 105.

The determination threshold setting module 106 sets the threshold to be used for the above-described determination processing performed by the determination processing module 105 based on, for example, validation data similar to the above-described learning data and inference data.

Figure 4:
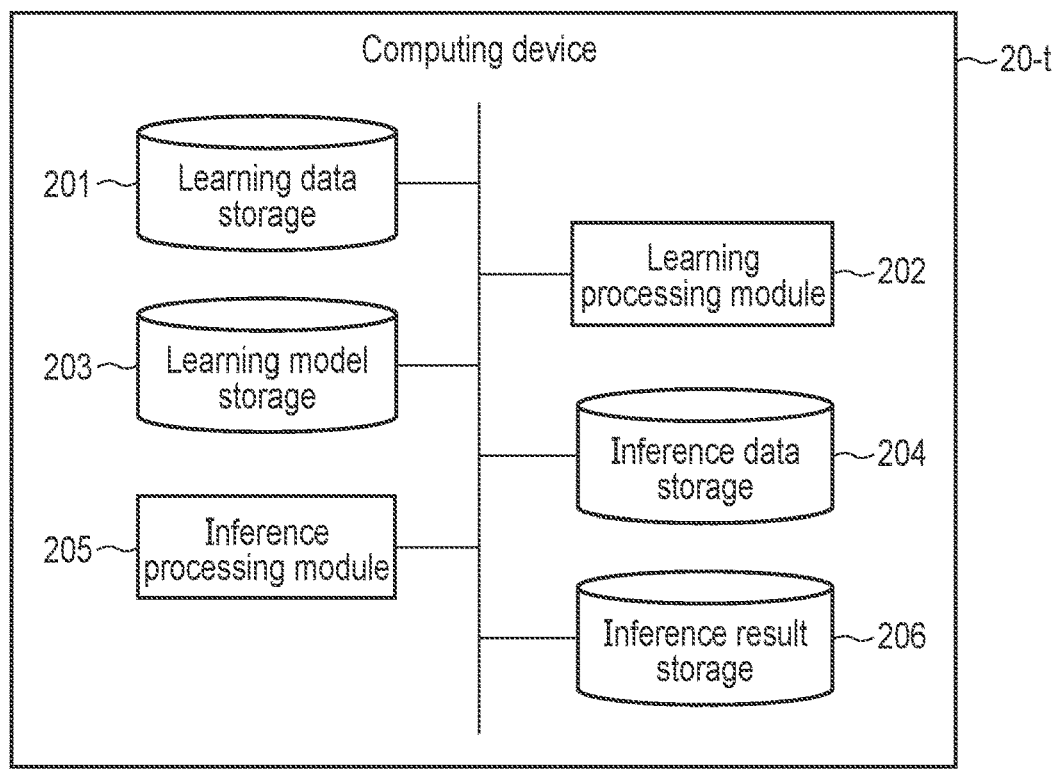
FIG. 4 is a block diagram illustrating an example of a functional configuration of a computing device.

FIG. 4 is a block diagram illustrating an example of a functional configuration of a computing device 20-$t$ ($t=1, 2, \ldots, n$) among the computing devices 20-1 to 20-$n$. As illustrated in FIG. 4, the computing device 20-$t$ includes learning data storage 201, a learning processing module 202, learning model storage 203, inference data storage 204, an inference processing module 205, and inference result storage 206.

According to the present embodiment, the learning data storage 201, the learning model storage 203, the inference data storage 204, and the inference result storage 206 included in the computing device 20-$t$ are implemented via a nonvolatile memory, a different storage device, or the like included in the computing device 20-$t$.

Further, the learning processing module 202 and the inference processing module 205 included in the computing device 20-$t$ are implemented partially or entirely via a predetermined program run on a CPU included in the computing device 20-$t$ (namely, a computer of the computing device 20-$t$), that is, via software. Note that the program to be run on the CPU may be stored in a computer-readable storage medium and distributed, or may be downloaded to the computing device 20-$t$ over the network 30.

The above description has been given based on the assumption that the learning processing module 202 and the inference processing module 205 are implemented via the predetermined program run on the CPU, but the learning processing module 202 and the inference processing module 205 may be implemented partially or entirely via hardware such as an IC or via a combination of software and hardware.

The learning data storage 201 stores a share associated with the computing device 20-$t$ among the n shares generated from the learning data X by the share generation module 102 included in the above-described secure computing management device 10.

The learning processing module 202 performs learning processing of causing the learning model to learn based on the share (share of the learning data X) stored in the learning data storage 201.

The learning model storage 203 stores the learning model (that is, a learning model that has been trained on the share of the learning data X) obtained as a result of learning processing performed by the learning processing module 202. Note that since each of the computing devices 20-1 to 20-$n$ performs the learning processing based on a different share, the learning model storage 203 of each of the computing devices 20-1 to 20-$n$ stores a learning model having the same initial configurations as described above but different learning contents (that is, a learning model having different parameters).

The inference data storage 204 stores a share associated with the computing device 20-$t$ among the n shares generated from the inference data Z by the share generation module 102 included in the above-described secure computing management device 10.

The inference processing module 205 performs inference processing based on the share (share of the inference data Z) stored in the inference data storage 204. Note that, in the inference processing, when the share of the inference data Z is input to the learning model stored in the learning model storage 203, data output from the learning model is obtained as inference result data.

The inference result storage 206 stores the inference result data obtained by the inference processing module 205. The inference result data stored in the inference result storage 206 is transmitted to the secure computing management device 10.

A description will be given below of how the secure computing system 1 according to the present embodiment operates. Processing (hereinafter, referred to as first processing) when the learning data X is input to the secure computing management device 10 (that is, the computing devices 20-1 to 20-$n$ are caused to perform the learning processing) and processing (hereinafter, referred to as second processing) when the inference data Z is input to the secure computing management device 10 (that is, the computing devices 20-1 to 20-$n$ are caused to perform the inference processing) will be described below.

Figure 5:
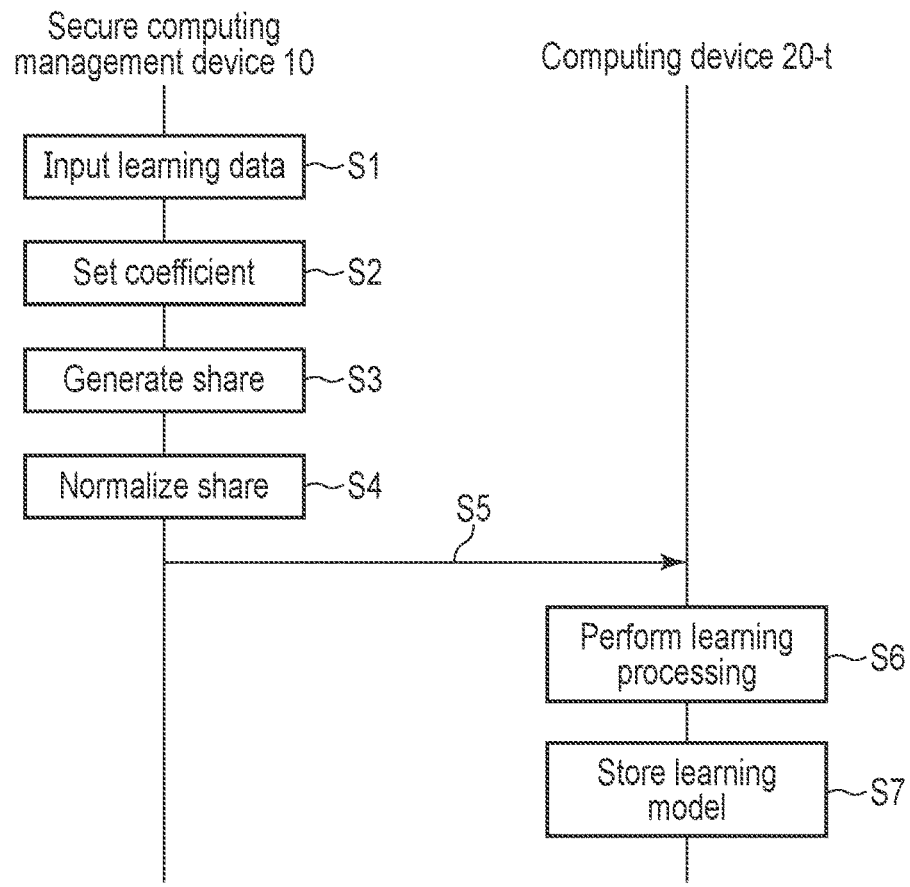
FIG. 5 is a sequence chart illustrating an example of a sequence of processing when learning data is input to the secure computing management device.

First, a description will be given of an example of a sequence of the above-described first processing with reference to the sequence chart illustrated in FIG. 5. Note that although only the computing device 20-$t$ that is one of the computing devices 20-1 to 20-$n$ is illustrated in FIG. 5 for the sake of convenience, it is assumed that the same processing is also performed by the other computing devices.

In the first processing, the secure computing management device 10 inputs the learning data X as described above (step S1). Note that the learning data X may be a learning data group X including a plurality of pieces of learning data. In this case, the secure computing management device 10 inputs the learning data group X={$X_1, \ldots, X_m$}. Each piece of the learning data $X_1, \ldots, X_m$ included in the learning data group X may be, for example, sensor data obtained at the same time from sensors installed in a plurality of devices (devices under a normal condition) of the same type, or may be sensor data obtained in time series from a sensor installed in the same device (device under a normal condition). In the following description, it is assumed that the learning data group X={$X_1, \ldots, X_m$} is input in step S1.

Further, as described above, when the learning model is an auto encoder, and the input layer and the output layer of the auto encoder each have d nodes (d is an integer equal to or greater than two), each piece of the learning data $X_1, \ldots, X_m$ includes an array of d pieces of sub-data (elements). Note that, assuming that the d pieces of sub-data constituting each piece of the learning data $X_1, \ldots, X_m$ are denoted as $x_d$, the pieces of sub-data $x_d$ correspond to, for example, sensor data obtained at the same time from d types of sensors installed in the same device.

In the following description, for the sake of convenience, the d pieces of sub-data constituting the learning data $X_1$ will be denoted as $x_{11}, \ldots, x_{1d}$, and the d pieces of sub-data constituting the learning data $X_m$ will be denoted as $x_{m1}, \ldots, x_{md}$. The same applies to the other pieces of learning data $X_2, \ldots, X_{m-1}$.

When step S1 is performed, the coefficient setting module 101 sets a coefficient (coefficient selected from the field Q) for use in generating shares of each piece of the learning data $X_1, \ldots, X_m$ included in the learning data group X based on the learning data group X (step S2).

In step S2, when the maximum value of all the pieces of sub-data $x_1, \ldots, x_d$ included in the learning data group X ($X_1, \ldots, X_m$) is denoted as $X_{max}$, coefficients $r_1, \ldots, r_k-1$ and $P_1, \ldots, P_n$ that satisfy the following expression (4) are set.

$$W(Pn)=\Sigma_{i=1}^{k-1} r_i P_n^i + X_{max} < Q \qquad \text{Expression (4)}$$

Note that the expression (4) is obtained a result of applying the above-described expression (3) to the learning data group X and represents that the coefficients $r_1, \ldots, r_k-1$ and $P_1, \ldots, P_n$ are set to make the maximum value ($W(P_n)$) of the shares (shares of sub-data) of each piece of learning data $X_1, \ldots, X_m$ included in the learning data group X less than the maximum value of the field Q. Further, Q in the expression (4) represents the maximum value of the field Q. Further, in the expression (4), $P_1, \ldots, P_n$ have a relationship of $P_1 < \ldots < P_n$.

The above-described coefficients set in step S2 are held in the coefficient setting module 101 for use in the second processing to be described later.

Next, the share generation module 102 generates n shares, each associated with a corresponding one of the computing devices 20-1 to 20-n, from each piece of learning data $X_1, \ldots, X_m$ included in the learning data group X based on the coefficients set in step S2 (step S3). In other words, the share generation module 102 generates n shares from the learning data $X_1$ and also generates n shares from the learning data $X_n$. The same applies to the other pieces of learning data $X_2, \ldots, X_m-1$.

Furthermore, according to the present embodiment, each piece of learning data $X_1, \ldots, X_m$ includes sub-data $x_d$, but in this case, the above-described shares are generated for each piece of sub-data.

Figure 6:
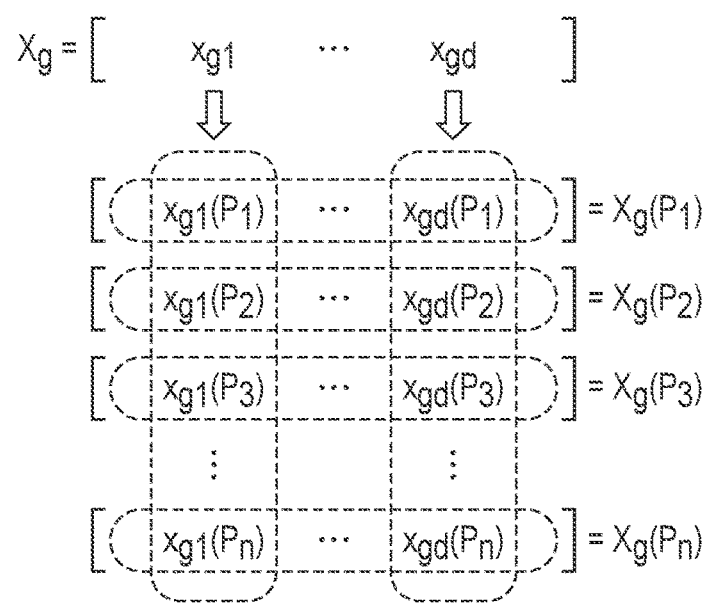
FIG. 6 is a diagram for describing shares generated for each piece of sub-data included in the learning data.

It is assumed below that, as illustrated in FIG. 6, learning data $X_g$ ($1 \le g \le m$) among the learning data $X_1, \ldots, X_m$ includes an array of sub-data $x_{g1}, \ldots, x_{gd}$. In this case, the share generation module 102 generates n shares from each piece of sub-data $x_{g1}, \ldots, x_{gd}$.

Specifically, n shares $x_{g1}(P_1), \ldots, x_{g1}(P_n)$ are generated from the sub-data $x_{g1}$. The share $x_{g1}(P_1)$ corresponds to the share $W(P_1)$ obtained by the above-described expression (1) where the intercept a of the expression (1) is replaced with the sub-data $x_{g1}$, and $r_1, \ldots, r_k-1$ and $P_1$ set as coefficients in step S2 are applied. The share $x_{g1}(P_n)$ corresponds to the share $W(P_n)$ obtained by the above-described expression (1) where the intercept a of the expression (1) is replaced with the sub-data $x_{g1}$, and $r_1, \ldots, r_k 1$ and $P_n$ set as coefficients in step S2 are applied. Although no detailed description will be given, the shares $x_{g1}(P_2), \ldots, x_{g1}(P_n-1)$ are obtained in the same manner.

Further, n shares $x_{gd}(P_1), \ldots, x_{gd}(P_n)$ are generated from the sub-data $x_{gd}$. The share $x_{gd}(P_1)$ corresponds to the share $W(P_1)$ obtained by the above-described expression (1) where the intercept a of the expression (1) is replaced with the sub-data $x_{gd}$, and $r_1, \ldots, r_k-1$ and $P_1$ set as coefficients in step S2 are applied. The share $x_{gd}(P_n)$ corresponds to the share $W(P_n)$ obtained by the above-described expression (1) where the intercept a of the expression (1) is replaced with the sub-data $x_{gd}$, and $r_1, \ldots, r_k-1$ and $P_n$ set as coefficients in step S2 are applied.

Although no detailed description will be given, the shares $x_{gd}(P_2), \ldots, x_{gd}(P_n-1)$ are obtained in the same manner.

Although the shares generated from each piece of sub-data $x_{g1}$ and $x_{gd}$ have been described above, n shares are generated from each piece of the other sub-data $x_{g2}, \ldots, x_{gd}-1$ in the same manner.

In this case, as illustrated in FIG. 6, the shares $x_{g1}(P_n), \ldots, x_{gd}(P_1)$ correspond to the shares $X_g(P_1)$ associated with the computing device 20-1. Further, the shares $x_{g1}(P_n), \ldots, x_{gd}(P_n)$ correspond to the shares $X_g(P_n)$ associated with the computing device 20-n.

According to the present embodiment, the n shares $X_g(P_1), \ldots, X_g(P_n)$, each including the shares of sub-data, are generated for the learning data $X_g$ as a result of the above-described processing using the above-described expression (1). Although the learning data $X_g$ has been described above, shares are generated for other learning data in the same manner.

Returning to FIG. 5 again, the share generation module 102 normalizes each of the shares (shares of sub-data included) of each piece of learning data $X_1, \ldots, X_m$ generated in step S3 (step S4). In this case, the share generation module 102 performs Max-Min Normalization processing. According to this Max-Min Normalization, each share is adjusted (normalized) to a value in a range of 0 to 1 by the following expression $$x_{mm} = (x - x_{min})/(x_{max} - x_{min}) \qquad \text{Expression (5)}$$

Note that $x_{mm}$ in the above-described expression (5) represents a normalized value of each share (share of sub-data) generated in step S3, and x in the expression (5) represents each share generated in step S3.

Further, $x_{max}$ in the expression (5) represents the maximum value of all the shares of sub-data to be input to the same node to which the share x of sub-data to be normalized is input (the same node included in the input layer of the auto encoder). Likewise, $x_{min}$ in the expression (5) represents the minimum value of all the shares of sub-data to be input to the same node to which the share x of sub-data to be normalized is input (the same node included in the input layer of the auto encoder). Specifically, when the share $x_{g1}(P_1)$ of the sub-data $x_{g1}$ illustrated in FIG. 6 is normalized by the expression (5), $x_{max}$ in the expression (5) represents the maximum value among the shares of the sub-data $x_1$ constituting each piece of learning data $X_1, \ldots, X_m$, and $x_{min}$ in the expression (5) represents the minimum value among the shares of the sub-data $x_1$ constituting each piece of learning data $X_1, \ldots, X_m$.

In step S4, each of the shares of the sub-data $x_1, \ldots, x_d$ constituting each piece of learning data $X_1, \ldots, X_m$ generated in step S3 is applied to the expression (5) to be normalized.

Note that the above description has been given based on the assumption that $x_{max}$ and $x_{min}$ are determined from real data (shares of sub-data $x_d$ constituting each piece of learning data $X_1, \ldots, X_m$), but, when a range of values that sensor data input as the sub-data can take is defined based on conditions such as a type of the sensor data (that is, a sensor type), $x_{max}$ and $x_{min}$ may be determined based on the range, for example.

Further, the above description has been given on the assumption that $x_{max}$ and $x_{min}$ have different values for each piece of sub-data $x_d$, but, when distributions (ranges) of the shares of the sub-data $x_d$ are similar to each other, $x_{max}$ and $x_{min}$ common to the shares of all the sub-data $x_d$ may be used.

When step S4 is performed, the secure computing management device 10 transmits the share (each share of the sub-data $x_1, \ldots, x_d$ constituting each piece of learning data $X_1, \ldots, X_m$) normalized in step S4 to a corresponding one of the computing devices 20-1 to 20-n (step S5).

In this case, for example, the share $X_g(P_1)$ of the learning data $X_g$ transmitted to the computing device 20-1 includes the shares $(x_{g1}(P_1), \ldots, x_{gd}(P_1))$ of the d pieces of sub-data as described above. This allows a share identical in data length to the learning data $X_g$ including the above-described d pieces of sub-data (that is, data length necessary for learning) to be transmitted to the computing device 20-1, thereby allowing the computing device 20-1 to appropriately perform the learning processing on the learning model (auto encoder).

A description will be given below of processing to be performed by the computing device 20-t among the computing devices 20-1 to 20-n. The shares of the learning data $X_1, \ldots, X_m$ that are associated with the computing device 20-t and transmitted in step S5 (hereinafter, denoted as $X_1(P_t), \ldots, X_m(P_t)$) are received by the computing device 20-t and stored in the learning data storage 201.

Next, the learning processing module 202 performs the learning processing on the learning model based on the shares $X_1(P_t), \ldots, X_m(P_t)$ of the learning data $X_1, \ldots, X_m$ stored in the learning data storage 201 (step S6).

It is assumed below to cause the learning model to learn the share $X_1(P_t)$ of the learning data $X_1$. In this case, the share $X_1(P_t)$ includes the d shares of sub-data (hereinafter, denoted as $x_{11}(P_t), \ldots, x_{1d}(P_t)$), and the learning processing module 202 inputs the d shares $x_{11}(P_t), \ldots, x_{1d}(P_t)$ of sub-data to the d input nodes included in the input layer of the auto encoder (learning model).

Since the auto encoder is configured to output output data that is a reconstruction of the input data as described above, for example, when the sensor data (group) obtained when the device is under a normal condition is input as the above-described learning data group X, the output data output from the auto encoder should be the same as the input data.

Therefore, in the above-described learning processing in step S6, an error between the share $X_1(P_t)$ input to the learning model (auto encoder) and the output data output from the learning model is obtained, and the parameters of the learning model are updated so as to make the error smaller.

This allows the learning model to learn the share $X_1(P_t)$. Although the share $X_1(P_t)$ of the learning data $X_1$ has been described above, the learning model learns each of the shares $X_1(P_t), \ldots, X_m(P_t)$ of the learning data $X_1, \ldots, X_m$ stored in the learning data storage 201 in step S6.

The learning model whose parameters have been updated as a result of the above-described processing performed in step S6 (that is, the learning model that has been trained on the shares of the learning data $X_m$) is stored in the learning model storage 203 (step S7).

Next, a description will be given of an example of a sequence of the above-described second processing with reference to the sequence chart illustrated in FIG. 7. Note that, in FIG. 7, only the computing device 20-t that is one of the computing devices 20-1 to 20-n is illustrated for the sake of convenience. In the second processing, the secure computing management device 10 inputs the inference data Z as described above (step S11). Note that the inference data Z is an array of d pieces of sub-data, like each piece of learning data $X_1, \ldots, X_m$ described above. Note that, assuming that the d pieces of sub-data constituting the inference data Z are denoted as $z_1, \ldots, z_d$, the sub-data $z_1, \ldots, z_d$ correspond to, for example, sensor data obtained at the same time from d types of sensors installed in the same device (a device to be subjected to abnormality determination).

When step S1 is performed, the coefficient setting module 101 reads the coefficients $r_1, \ldots, r_k-1$ and $P_1, \ldots, P_n$ held in the coefficient setting module 101 in the above-described first processing (step S12).

Next, the share generation module 102 generates n shares, each associated with a corresponding one of the n computing devices 20-1 to 20-n, from the inference data Z based on the coefficients read in step S2 (step S13). Note that step S13 corresponds to the above-described step S3 illustrated in FIG. 5, and thus no detailed description of step S13 will be given below.

Note that, assuming that shares $Z(P_1), \ldots, Z(P_n)$ of the inference data Z are generated as a result of the processing performed in step S13, the share $Z(P_1)$ of the inference data Z includes shares $z_1(P_1), \ldots, z_d(P_1)$ of the sub-data $z_1, \ldots, z_d$ constituting the inference data Z. The same applies to the other shares $Z(P_2), \ldots,$ and $Z(P_n)$.

Next, steps S14 and S15 corresponding to the above-described steps S4 and S5 illustrated in FIG. 5 are performed. Note that steps S14 and S15 are the same as steps S4 and S5 illustrated in FIG. 5 except that the shares of each piece of learning data $X_1, \ldots, X_m$ described with reference to FIG. 5 are the shares of the inference data Z, and thus no detailed description of steps S14 and S15 will be given below.

A description will be given below of processing to be performed by the computing device 20-t among the computing devices 20-1 to 20-n. The share of the inference data Z that is associated with the computing device 20-t and transmitted in step S15 (hereinafter, referred to as a share $Z(P_t)$) is received by the computing device 20-t and stored in the inference data storage 204.

Next, the inference processing module 205 performs the inference processing on the share $Z(P_t)$ of the inference data Z using the learning model stored in the learning model storage (learning model on which the learning processing has been performed by the computing device 20-$t$) (step S16).

In this case, the share $Z(P_t)$ of the inference data Z includes d shares of sub-data (hereinafter, denoted as $z_1(P_t), \ldots, z_d(P_t)$), and the inference processing module 205 performs inference (processing) by inputting the d shares $z_i(P_t), \ldots, z_d(P_t)$ of sub-data to d input nodes included in the input layer of the auto encoder (learning model). Accordingly, the inference processing module 205 can obtain the output data output from (d output nodes included in the output layer of) the auto encoder as the inference result data.

Note that, assuming that the inference result data obtained as a result of the processing performed in step S16 is denoted as dec' ($P_t$), the inference result data dec' ($P_t$) includes d pieces of sub-data $\text{dec}_1'(P_t), \ldots, \text{dec}_d'(P_t)$.

When step S16 is performed, the inference result data dec' ($P_t$) is stored in the inference result storage 206 (step S17).

In order to decode the result of the inference performed by each of the computing devices 20-1 to 20-$n$, k pieces of inference result data are required as described above. Therefore, the secure computing management device 10 selects k computing devices from among the computing devices 20-1 to 20-$n$ in order to obtain (collect) the k pieces of inference result data. In this case, although not illustrated in FIG. 7, the secure computing management device 10 instructs each of selected k computing devices to transmit the inference result data.

When the k computing devices selected by the secure computing management device 10 include the computing device 20-$t$, the computing device 20-$t$ transmits the inference result data dec'($P_t$) stored in the inference result storage 206 to the secure computing management device 10 in accordance with the instruction from the secure computing management device 10 (step S18). Note that computing devices other than the computing device 20-$t$ among the above-described k computes selected by the secure computing management device 10 transmit the inference result data to the secure computing management device 10 in the same manner.

In the following description, for the sake of convenience, it is assumed that the inference result data is transmitted from each of the computing devices 20-1 to 20-$k$ as the k computing devices. A description will be given below based on the assumption that the inference result data is transmitted from the computing devices 20-1 to 20$k$, but the k computing devices may be selected as desired. Hereinafter, the k pieces of inference result data transmitted from the computing devices 20-1 to 20$k$ are referred to as inference result data dec' ($P_1$), . . . , dec' ($P_k$).

The secure computing management device 10 receives the k pieces of inference result data dec' ($P_1$), . . . , dec' ($P_k$) transmitted from the k computing devices as described above.

Each of the k pieces of inference result data dec' ($P_1$), . . . , dec' ($P_k$) received by the secure computing management device 10 is a result of inference (computation) based on the share of the inference data Z (normalized share of the inference data Z) using the learning model, and is thus a real number in a range of 0 to 1. Therefore, in order to perform the decoding processing as part of the secure computing on the k pieces of inference result data dec' ($P_1$), . . . , dec' ($P_k$) received by the secure computing management device 10, it is required that each of the k pieces of inference result data dec' ($P_1$), . . . , dec' ($P_k$) be converted into an integer.

In this case, the inference result decoding module 103 converts each of the k pieces of inference result data dec' ($P_1$), . . . , dec' ($P_k$) into an integer using the above-described expression (5) (step S19).

A description will be given below of how to convert the inference result data dec' ($P_t$) (here, $1 \le t \le k$) into an integer. As described above, since the inference result data dec' ($P_t$) includes d pieces of sub-data $\text{dec}_1'(P_t), \ldots, \text{dec}_d'(P_t)$, the integer conversion is performed on each piece of sub-data $\text{dec}_1'(P_t), \ldots, \text{dec}_d'(P_t)$. In this case, for example, the sub-data $\text{dec}_1'(P_t)$ is substituted into the left side of the above-described expression (5) to obtain x on the right side. x thus obtained corresponds to the sub-data $\text{dec}_1'(P_t)$ converted into an integer. Note that when the sub-data $\text{dec}_1'(P_t)$ is converted into an integer, $m_{max}$ and $m_{min}$ used in normalizing the share $z_1(P_t)$ of the sub-data $z_1$ included in the share $Z(P_t)$ of the inference data Z (that is, $m_{max}$ and $m_{min}$ associated with the sub-data $\text{dec}_1'(P_t)$) as described above are used. Likewise, when the other pieces of sub-data $\text{dec}_2'(P_t), \ldots, \text{dec}_d'(P_t)$ are each converted into an integer, $m_{max}$ and $m_{min}$ associated with each piece of sub-data $\text{dec}_2'(P_t), \ldots, \text{dec}_d'(P_t)$ are used.

Note that when a result of the integer conversion as described above (that is, x obtained by the expression (5)) is not an integer, the result is rounded off to the nearest integer.

Such processing performed on each piece of inference result data dec' ($P_1$), . . . , dec' ($P_k$) allows each piece of (sub-data of) inference result data dec' ($P_1$), . . . , dec' ($P_k$) to be converted into an integer.

When step S19 is performed, the inference result decoding module 103 decodes the k pieces of inference result data dec' ($P_1$), . . . , dec' ($P_k$), each converted into an integer in step S19 (step S20).

Note that when decoded data obtained as a result of decoding the k pieces of inference result data is denoted as decoded data dec, in step S20, the decoded data dec can be reconstructed by the expression (2) where the above-described data a is replaced with the decoded data dec, and $[a]_{t1}, \ldots, [a]_{tk}$ are replaced with the inference result data dec' ($P_1$), . . . , dec' ($P_k$), by using the above-described Lagrange interpolation.

Note that since each piece of inference result data dec' ($P_1$), . . . , dec' ($P_k$) includes d pieces of sub-data as described above, the decoded data dec includes d pieces of sub-data $\text{dec}_1, \ldots, \text{dec}_d$, like the above-described inference data Z.

According to the present embodiment, since each of the computing devices 20-1 to 20$k$ that have transmitted the k pieces of inference result data dec' ($P_1$), . . . , dec' ($P_k$) performs inference based on a corresponding one of the different shares $Z(P_1), \ldots, Z(P_k)$, there is a possibility that an error will occur in (the sub-data included in) the decoded data dec obtained as a result of decoding the inference result data dec' ($P_1$), . . . , dec' ($P_k$) obtained by each of the computing devices 20-1 to 20$k$. In particular, when the decoded value that represents a true result when the decoded value is nearly equal to zero has a negative error, (the value of) the sub-data included in the decoded data dec becomes nearly equal to the maximum value of the field Q (that is, the sub-data has a value nearly equal to the maximum value of the field Q) because the secure computing based on the field Q is performed. In this case, for example, when one of the d pieces of sub-data included in the decoded data dec described above is nearly equal to the maximum value of the field Q, the influence of the sub-data on the other sub-data increases, and there is a possibility that an appropriate detection result cannot be obtained.

Therefore, according to the present embodiment, the decoded data correction module 104 determines whether each piece of sub-data $dec_1, \ldots, dec_d$ included in the decoded data dec is nearly equal to the maximum value of the field Q (that is, the decoded data≈Q) (step S21). Note that a determination line (threshold) for use in determining that each piece of sub-data $dec_1, \ldots, dec_d$ is nearly equal to the maximum value of the field Q is preset. Accordingly, when a difference between the sub-data $dec_1, \ldots, dec_d$ and the maximum value of the field Q is less than the threshold, it can be determined that the sub-data is nearly equal to the maximum value of the field Q.

It is assumed below that it is determined that the sub-data dec' included in the decoded data dec is nearly equal to the maximum value of the field Q (YES in step S21). In this case, the decoded data correction module 104 corrects the sub-data dec' included in the decoded data dec (step S22).

Note that the occurrence of a negative error in a value that is nearly equal to zero and represents a true result as described above causes the true result to be represented by a negative value, (the value of) the sub-data dec' obtained as a result of decoding by the inference result decoding module 103 becomes a value like the maximum value −α' (α' is an integer) of the field Q (that is, a value nearly equal to the maximum value of the field Q).

Therefore, the sub-data dec' is corrected in step S22, like "the maximum value of the field Q—the sub-data $dec_1$". When the sub-data $dec_1$ has a value like the maximum value—a' of the field Q as described above, correcting (converting) the sub-data $dec_1$ like "the maximum value of the field Q—the sub-data $dec_1$" allows the sub-data $dec_1$ to be substantially treated as a', thereby alleviating the influence generated when the sub-data $dec_1$ is nearly equal to the field Q.

As described above, for example, when the sub-data dec' is corrected as a result of the processing performed in step S22, replacing the sub-data dec' included in the decoded data dec obtained as a result of the processing performed in step S20 with the sub-data dec' thus corrected causes (a data string of) the decoded data dec to be reconstructed (step S23).

Although the case where the sub-data dec' is corrected has been described above, when the other sub-data $dec_2, \ldots, dec_d$ is nearly equal to the maximum value of the field Q, the sub-data is corrected in the same manner.

Note that when it is determined that none of the sub-data $dec_1, \ldots, dec_d$ included in the decoded data dec is nearly equal to the maximum value of the field Q (NO in step S21), neither step S22 nor step S23 is performed.

In the following description, the decoded data dec reconstructed in step S23 and the decoded data dec obtained as a result of decoding in step S20 when neither step S22 nor step S23 is performed are simply referred to as decoded data dec for the sake of convenience.

Next, the determination processing module 105 performs determination processing of determining whether a device is under an abnormal condition from an error value (reconstruction error) based on a difference between the inference data and the decoded data using, for example, a threshold (hereinafter, referred to as a determination threshold Lth) for use in detecting an abnormality in the device (step S24).

Here, as described above, assuming that the learning model held in each of the computing devices 20-1 to 20-n (learning model stored in the learning model storage 203) is an auto encoder, as described above, the auto encoder is trained to output the same data as the input data when the device is under a normal condition, for example. In other words, for example, when the device is under an abnormal condition, the auto encoder outputs data different from the input data.

Therefore, abnormality detection is performed in step S24 to determine that the device is under an abnormal condition when the error value between the inference data and the decoded data is equal to or greater than the determination threshold Lth (that is, the degree of divergence is large).

Note that, in the above-described step S24, the sum of differences between the inference data Z normalized by the above-described expression (5) (inference data Z before secret sharing is applied) and the decoded data dec is used as an evaluation index (that is, the error value). The sum of differences corresponds to the sum of differences between the pieces of sub-data, each associated with a corresponding node, and the sum of differences zd is obtained by the following expression (6).

$$zd = \Sigma_i^d |z_i - dec_i| \qquad \text{Expression (6)}$$

$Z_i$ in the above-described expression (6) represents normalized sub-data of the inference data Z associated with a node i among the d nodes, and $dec_i$ represents normalized sub-data of the decoded data dec associated with the node i.

Figure 7:
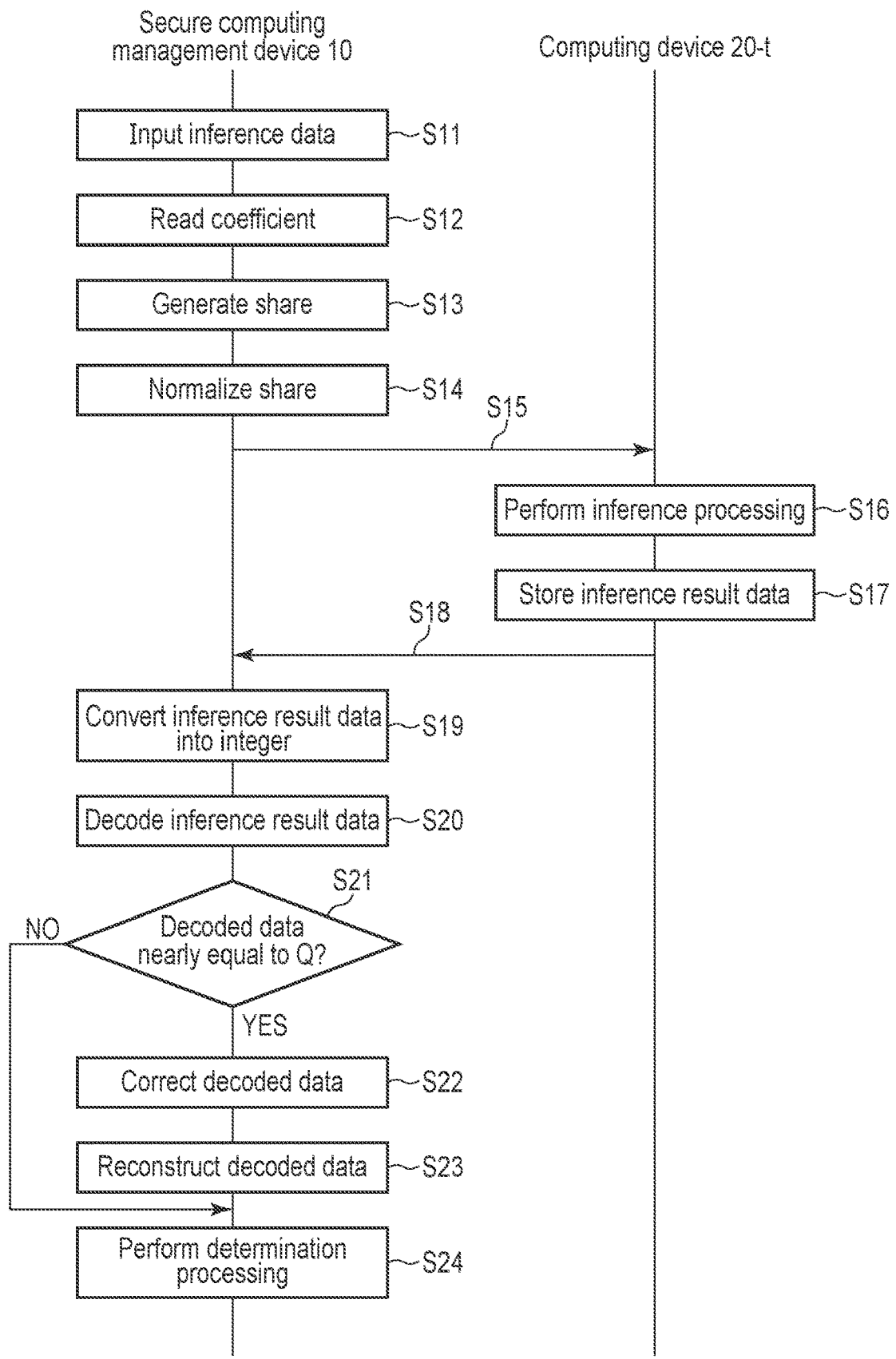
FIG. 7 is a sequence chart illustrating an example of a sequence of processing when inference data is input to the secure computing management device.

Note that the above description has been given based on the assumption that one piece of inference data Z is input to the secure computing management device 10 with reference to FIG. 7, but a plurality of pieces of inference data Z (that is, the inference data group) may be input to the secure computing management device 10.

Figure 8:
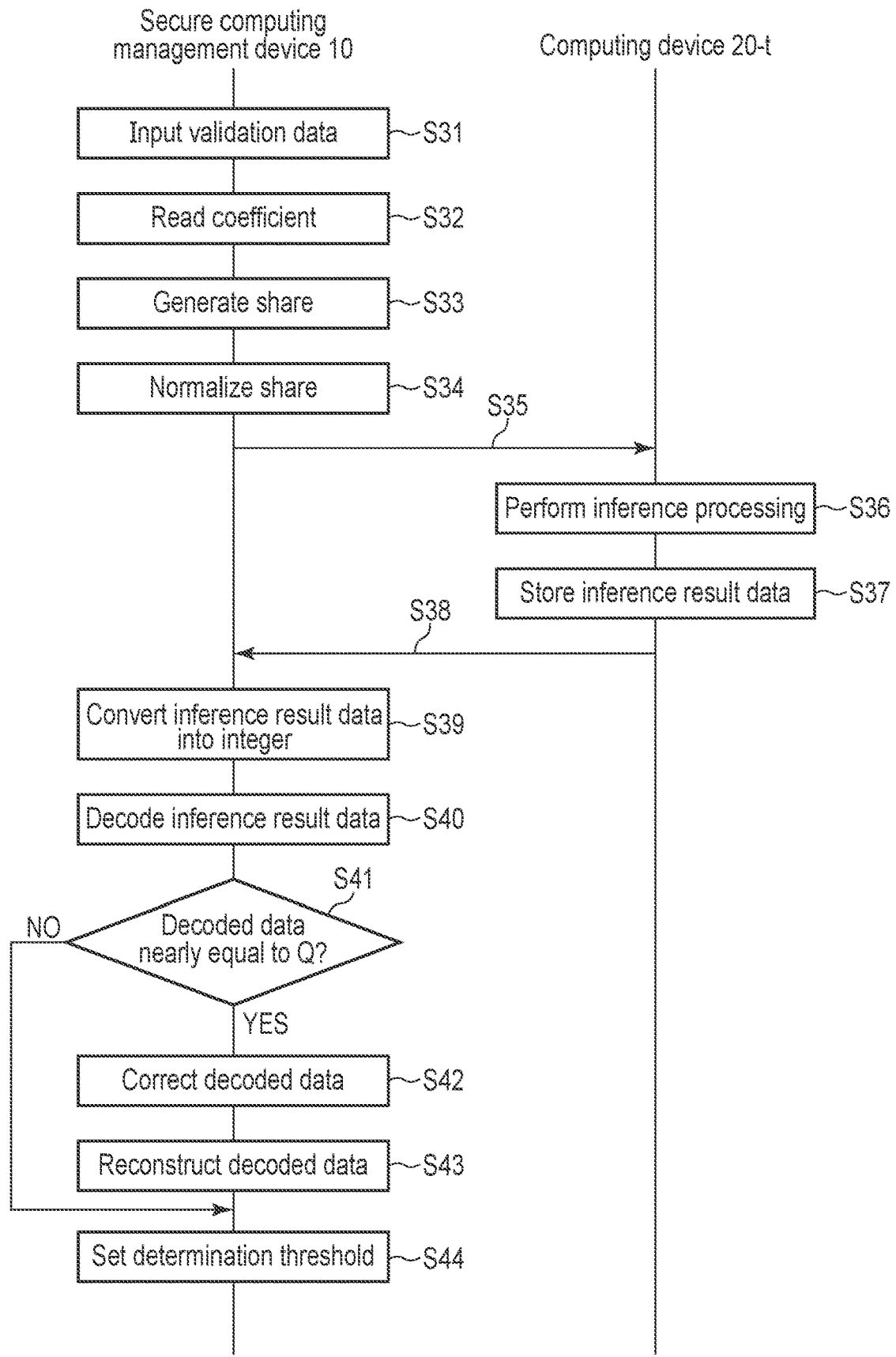
FIG. 8 is a sequence chart illustrating an example of a sequence of processing when a determination threshold is set.

The determination threshold Lth is used in the above-described step S24, and a description will be given below of an example of a sequence of processing of setting the determination threshold Lth with reference to the sequence chart illustrated in FIG. 8. Note that, in FIG. 8, only the computing device 20-t that is one of the computing devices 20-1 to 20-n is illustrated for the sake of convenience, as in FIG. 7 described above.

In this case, the secure computing management device 10 inputs validation data different from the above-described learning data (step S21). The validation data is sensor data obtained from a sensor installed in a device under a normal condition, like the above-described learning data (group) X. Note that it is desirable that the validation data be different from the learning data X, but, when a sufficient number of pieces of data cannot be prepared, the learning data X may be used as the validation data.

After step S1 is performed, steps S32 to S43 corresponding to the above-described steps S12 to S23 illustrated in FIG. 7 are performed. Note that steps S32 to S43 are the same as described with reference to FIG. 7 except that the validation data is used instead of the inference data Z described with reference to FIG. 7, and thus no detailed description of steps S32 to S43 will be given below.

Next, the determination threshold setting module 106 included in the secure computing management device 10 sets the determination threshold Lth from the error value (reconstruction error) based on the difference between the validation data and the decoded data (step S44).

In this case, since the validation data corresponds to the sensor data obtained from the sensor installed in the device under a normal condition as described above, it is preferable to obtain a determination result indicating that the device is under a normal condition when the above-described step S24 illustrated in FIG. 7 is performed based on the validation data (and decoded data).

Therefore, in step S44, a value indicating that the device is determined to be under a normal condition based on the error value between the validation data and the decoded data (for example, a value greater than the error value) is set as the determination threshold Lth.

The determination threshold Lth set in step S44 is held in, for example, the determination processing module 105 and is used in the above-described step S24 illustrated in FIG. 7.

The above description has been given based on the assumption that the determination threshold Lth is set based on one piece of validation data for the sake of convenience, but it is possible to set the determination threshold Lth based on a plurality of pieces of validation data (validation data group) so as to make the determination threshold Lth higher in accuracy. In this case, it is preferable that a value that makes the determination result based on the error value between the validation data and the decoded data the highest in accuracy be set as the determination threshold Lth, for example.

As described above, according to the present embodiment, a coefficient selected from the field (ring of integers) Q with $X \in Q$ is set based on the learning data (first data) X input to the secure computing management device 10, the secret sharing is applied to the learning data X to generate n shares (first fragment data), each associated with a corresponding one of the n computing devices 20-1 to 20-$n$, from the learning data X based on the coefficient thus set, and the learning model held in each of the n computing devices 20-1 to 20-$n$ is caused to learn a corresponding share of the learning data X. Further, according to the present embodiment, the secret sharing is applied to the inference data (second data) Z input to the secure computing management device 10 to generate n shares (second fragment data), each associated with a corresponding one of the n computing devices 20-1 to 20-$n$, from the inference data Z based on the coefficient set as described above, each of the n computing devices 20-1 to 20-$n$ performs inference (computation) using the learning model held in the computing device based on a corresponding share of the inference data Z, and the inference result data (computation result data) obtained as a result of inference performed by each of k computing devices 20-1 to 20-$k$ among the n computing devices 20-1 to 20-$n$ is decoded. Note that the coefficient according to the present embodiment is set to make each of the n shares of the learning data X less than the maximum value of the field Q.

Such a configuration according to the present embodiment allows an increase in accuracy of data decoding under the secure computing. Specifically, as described above, when the inference result data exceeding the field Q (finite field) under the above-described secure computing is obtained, the inference result data cannot be correctly decoded. On the other hand, according to the present embodiment, the inference result data is prevented from exceeding the field Q by setting a limit on the coefficient for use in generating the shares, thereby avoiding a situation where the inference result data fails to be decoded correctly.

Note that, according to the present embodiment, $r_1, \ldots, r_k-1$ (first coefficient), which are k−1 random elements of the field Q, and $P_1, \ldots, P_n$ (second coefficient), which are n random elements of the field Q, each associated with a corresponding one of the n computing devices 20-1 to 20-$n$, are set as coefficients, and n shares $W(P_1), \ldots, W(P_n)$ of the learning data X are generated based on the above-described expression (1) where the above-described data a to be kept secret is replaced with the learning data X (that is, a polynomial of degree k−1 with the learning data X as an intercept). In this case, $r_1, \ldots, r_k-1$ and $P_1, \ldots, P_n$ described above are set to make the maximum value of the n shares $W(P_1), \ldots, W(P_n)$ of the learning data X less than the maximum value of the field Q.

Furthermore, according to the present embodiment, when the decoded data dec obtained as a result of decoding the k pieces of inference result data is nearly equal to the maximum value of the field Q, the decoded data dec is corrected based on the maximum value of the field Q. In this case, (the sub-data of) the decoded data dec is corrected to a value obtained as a result of subtracting the decoded data dec from the maximum value of the field Q.

Such a configuration according to the present embodiment allows the decoded data dec with higher accuracy to be obtained, so that the accuracy of the determination processing (for example, processing of detecting an abnormality in the device, or the like) using the inference data Z and the decoded data dec can be increased.

Furthermore, according to the present embodiment, n shares of the learning data X and n shares of the inference data Z are normalized by, for example, Max-Min Normalization and transmitted to the n computing devices 20-1 to 20-$n$.

Generally speaking, the secure computing (secret sharing) with no limit set on the coefficients for use in generating the shares can achieve higher safety, but, according to the present embodiment, a limit is set on the coefficients, so that there is concern about the possibility of safety decreasing. According to the present embodiment, however, normalizing the shares before transmitting the shares to the computing devices 20-1 to 20-$n$ as described above can suppress a decrease in safety that may occur due to a limit set on the coefficients.

Further, according to the present embodiment, when k pieces of inference result data are received from k computing devices, the k pieces of inference result data are converted into integers and then decoded. Such a configuration allows the decoding processing under the secure computing to be appropriately performed.

Further, the above description according to the present embodiment has been given based on the assumption that the learning model included in each of the n computing devices 20-1 and 20-$n$ is an auto encoder trained to make data output from the learning model identical to data input into the learning model, but the learning model may be built by a different algorithm.

Note that the above description according to the present embodiment has been given mainly of the case where the secure computing system 1 provides, for example, a service for detecting an abnormality in a device in a factory (that is, performing abnormality detection on the device), but the secure computing system 1 may provide a different service.

That is, the above description according to the present embodiment has been given based on the assumption that the secure computing management device 10 inputs the sensor data obtained from the sensor installed in the device as the learning data X and the inference data Z, but various types of data may be used as the learning data X and the inference data Z in a manner that depends on the above-described service provided by the secure computing system 1.

Second Embodiment

A description will be given below of a second embodiment. Note that the present embodiment is the same as the above-described first embodiment in the network configuration of the secure computing system, and the hardware configurations and functional configurations of the secure computing management device and the plurality of computing devices included in the secure computing system, and thus no detailed description of such configurations will be given below. The description will be given with reference to FIGS. 1 to 4 as needed. Further, the description according to the present embodiment will focus mainly on differences from the first embodiment.

The present embodiment is different from the above-described first embodiment in processing (second processing) when inference data is input to a secure computing management device 10.

A description will be given below of an example of a sequence of the second processing according to the present embodiment with reference to the sequence chart illustrated in FIG. 9. Note that, in FIG. 9, only a computing device 20-$t$ that is one of computing devices 20-1 to 20-$n$ is illustrated for the sake of convenience, as in FIG. 7 described above.

In the second processing according to the present embodiment, steps S51 to S60 corresponding to the above-described steps S11 to S20 illustrated in FIG. 7 are performed. Note that, when step S57 is performed, the secure computing management device 10 selects k computing devices to obtain k pieces of inference result data as described in the above-described first embodiment, but in the following description, it is assumed that the k computing devices thus selected are the computing devices 20-1 to 20-$k$.

The above description according to the first embodiment has been given based on the assumption that sub-data nearly equal to the maximum value of the field Q among the d pieces of sub-data $dec_1, \ldots, dec_d$ included in the decoded data dec is corrected, but, when the number of pieces of sub-data nearly equal to the maximum value of the field Q is large, the determination processing is performed based on the decoded data dec reconstructed from the large number of pieces of sub-data thus corrected, and there is a possibility that a highly accurate determination result cannot be obtained (for example, a highly accurate abnormality detection result cannot be provided).

Therefore, according to the present embodiment, a determination is made as to whether a ratio of (the number of) pieces of sub-data nearly equal to the maximum value of the field Q to the d pieces of sub-data included in the decoded data dec obtained as a result of decoding the k pieces of inference result data in step S60 is greater than or equal to a threshold Pth (step S61).

When it is determined that the ratio is equal to or greater than the threshold Pth (YES in step S61), the processing returns to step S58 and then repeated. In this case, the secure computing management device 10 selects k computing devices different in combination from the above-described k computing devices 20-1 to 20-$k$, and receives again k pieces of inference result data from the k computing devices thus selected. Then, steps subsequent to step S58 are performed based on the k pieces of inference result data thus received again.

Note that the k computing devices different in combination from the k computing devices 20-1 to 20-$k$ may be k computing devices in which at least one computing device among the computing devices 20-1 to 20-$k$ is different.

Further, the number of combinations applied when k computing devices are selected from among the n computing devices 20-1 to 20-$n$ is $_nC_k$, but the order (algorithm) of selecting (the combination of) the k computing devices may be determined as desired.

When it is determined that the above-described ratio is less than the threshold Pth (NO in step S61), steps S62 to S65 corresponding to the above-described steps S21 to S24 illustrated in FIG. 7 are performed.

As described above, according to the present embodiment, when the decoded data dec includes d pieces of sub-data (elements), and the ratio of sub-data nearly equal to the maximum value of the field (ring of integers) Q (hereinafter, referred to as sub-data that needs to be corrected) to the d pieces of sub-data is equal to or greater than the threshold Pth (predetermined value), inference result data is received again from k pieces of computing devices different in combination and then decoded.

Since the learning models held in the n computing devices 20-1 to 20-$n$ have the same initial configurations but are obtained as a result of learning different shares, an error occurring in the decoded data obtained as a result of decoding the inference result data transmitted from each of the k computing devices possibly varies in a manner that depends on a combination of the k computing devices.

Therefore, according to the present embodiment, as described above, when the ratio of sub-data that needs to be corrected to the d pieces of sub-data is equal to or greater than the threshold Pth, it is possible to obtain decoded data with less influence of an error by receiving the inference result data again from the k computing devices different in combination, thereby allowing an increase in accuracy of the decoded data.

Figure 9:
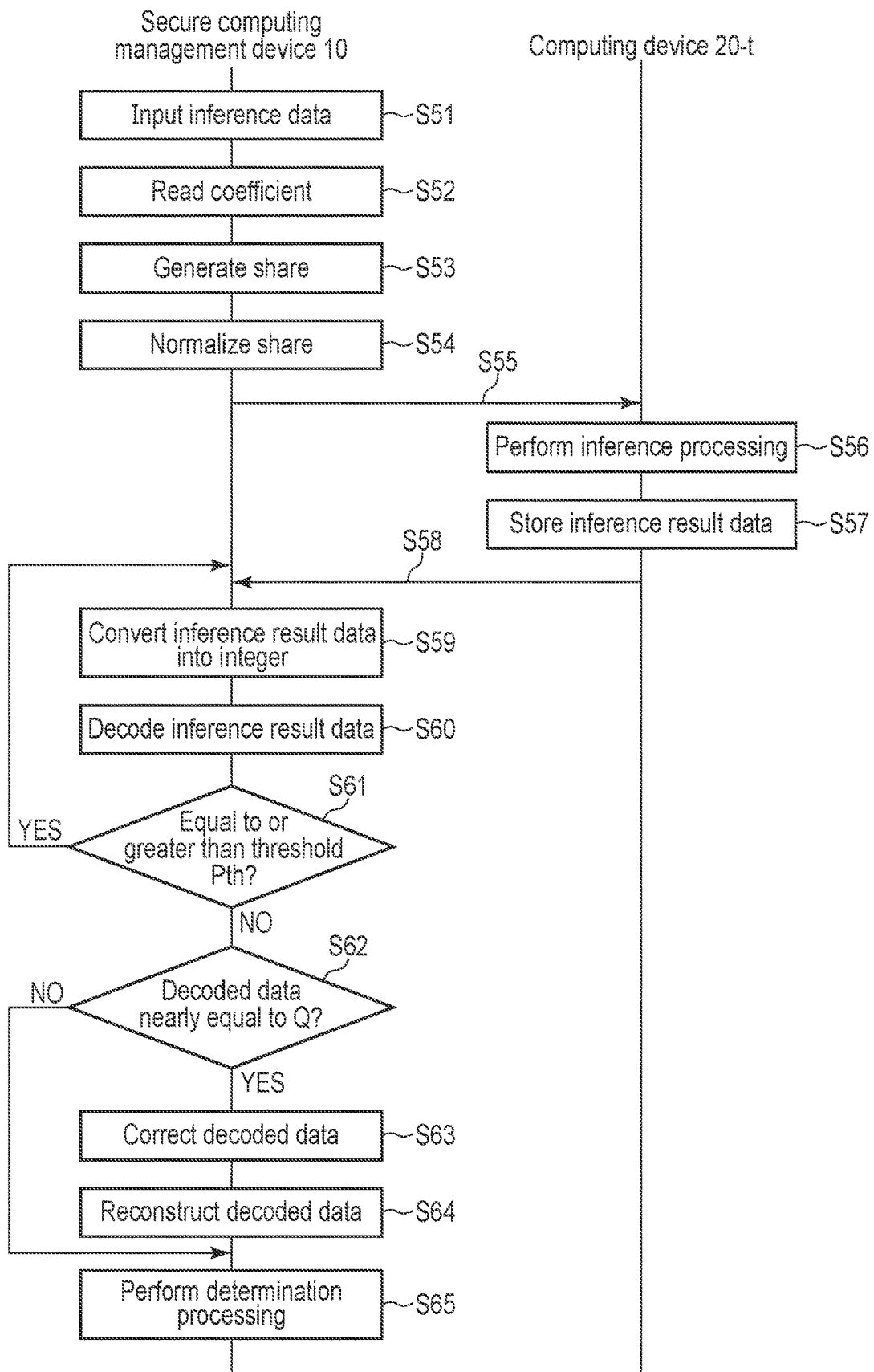
FIG. 9 is a sequence chart illustrating an example of a sequence of processing when inference data is input to a secure computing management device according to a second embodiment.

Note that, for example, under a configuration where a plurality of pieces of inference data Z (that is, an inference data group) are input to the secure computing management device 10, when step S60 illustrated in FIG. 9 is performed, a plurality of pieces of decoded data dec corresponding to the plurality of pieces of inference data Z are obtained. In this case, when the ratio of sub-data that needs to be corrected to all the pieces of sub-data included in each of the plurality of pieces of decoded data dec is equal to or greater than the threshold Pth, inference result data may be received from k pieces of computing devices different in combination.

Further, the above description according to the present embodiment has been given based on the assumption that the inference result data is received again from the k computing devices when the ratio of sub-data that needs to be corrected to the d pieces of sub-data included in the decoded data dec is equal to or greater than the threshold Pth, but when the ratio is equal to or greater than the threshold Pth, the coefficient read in step S52 illustrated in FIG. 9 may be adjusted.

Specifically, the coefficients $r_1, \ldots, r_k-1$ and $P_1, \ldots, P_n$ read in step S52 illustrated in FIG. 9 are set to make each of the shares (shares of sub-data) of the learning data (group) X less than the maximum value of the field Q as described according to the above-described first embodiment, but when the ratio of sub-data that needs to be corrected to the d pieces of sub-data included in the decoded data dec is equal to or greater than the threshold Pth, a coefficient $r_1', \ldots, r_k-1'$ that makes each of the shares (shares of sub-data) of the learning data X less than the maximum value of the field Q and is different from the coefficient $r_1, \ldots, r_k-1$ read in the above-described step S52 is set again, for example.

In this case, steps subsequent to step S52 may be performed based on $r_1', \ldots, r_k'$ set again and $P_1, \ldots, P_n$ read in step S52.

The above description has been given based on the assumption that the coefficient $r_1, \ldots, r_k-1$ is adjusted, but $P_1, \ldots, P_n$ may be adjusted, or both $r_1, \ldots, r_k-1$ and $P_1, \ldots, P_n$ may be adjusted.

According to at least one of the above-described embodiments, it is possible to provide a secure computing method, a secure computing system, and a secure computing device that allow an increase in accuracy of decoding of a result of secure computing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secure computing method to be performed by a secure computing system comprising a secure computing management device and n computing devices, where n is an integer equal to or greater than two, communicatively coupled to the secure computing management device, the secure computing method comprising:

setting a coefficient selected from a ring of integers Q with $X \in Q$ based on first data X input to the secure computing management device;

performing secret sharing on the first data X and generating n pieces of first fragment data, each associated with a corresponding one of the n computing devices, from the first data X based on the set coefficient;

causing, by each of the n computing devices, a learning model held in the computing device to learn the first fragment data associated with the computing device;

performing secret sharing on the second data Z and generating n pieces of second fragment data, each associated with a corresponding one of the n computing devices, from second data Z input to the secure computing management device based on the set coefficient;

performing, by each of the n computing devices, inference based on the second fragment data associated with the computing device using the learning model held in the computing device; and obtaining decoded data dec by decoding k pieces of inference result data obtained as a result of inference performed by each of k computing devices among the n computing devices, where k is an integer equal to or greater than two and equal to or less than n, wherein the coefficient is set to make each of the n pieces of first fragment data less than a maximum value of the ring of integers Q, wherein the setting comprises setting, as the coefficient, a first coefficient $r_1, \ldots, r_{k-1}$ and a second coefficient $P_1, \ldots, P_n$, the first coefficient $r_1, \ldots, r_{k-1}$ corresponding to k−1 random elements of the ring of integers Q, the second coefficient $P_1, \ldots, P_n$ corresponding to n random elements of the ring of integers Q, each associated with a corresponding one of the n computing devices, the generating comprises generating n pieces of first fragment data $W(P_1), \ldots, W(P_n)$ based on a polynomial of degree k−1

$$\Sigma_{i=1}^{k-1} r_i P^i + X$$

with the first data X as an intercept, and the first coefficient and the second coefficient are set to make a maximum value of the n pieces of first fragment data $W(P_1), \ldots, W(P_n)$ less than the maximum value of the ring of integers Q.

2. The secure computing method according to claim 1, further comprising correcting the decoded data dec based on the maximum value of the ring of integers Q when the decoded data dec is nearly equal to the maximum value of the ring of integers Q.

3. The secure computing method according to claim 2, wherein the correcting comprises correcting the decoded data dec to a value obtained as a result of subtracting the decoded data dec from the maximum value of the ring of integers Q.

4. The secure computing method according to claim 1, wherein the n pieces of first fragment data and the n pieces of second fragment data are normalized by Max–Min Normalization.

5. The secure computing method according to claim 4, further comprising converting the k pieces of inference result data into integers.

6. The secure computing method according to claim 1, wherein the learning model held in each of the n computing devices comprises an auto encoder trained to make data output from the learning model identical to data input to the learning model.

7. The secure computing method according to claim 1, wherein the second data Z comprises a plurality of elements $z_1, \ldots, z_d$, where d is an integer equal to or greater than two, the decoded data dec comprises a plurality of elements $dec_1, \ldots, dec_d$ corresponding to the elements $z_1, \ldots, z_d$, and the decoding k pieces of inference result data comprises decoding again inference result data obtained as a result of inference performed by each of k computing devices different in combination from the k computing devices when a ratio of elements nearly equal to the maximum value of the ring of integers Q to the elements $d_{ec1}, \ldots, dec_d$ is equal to or greater than a predetermined value.

8. The secure computing method according to claim 1, wherein the second data Z comprises a plurality of elements $z_1, \ldots, z_d$, the decoded data dec comprises a plurality of elements $dec_1, \ldots, dec_d$ corresponding to the elements $z_1, \ldots, z_d$, the setting comprises setting again a coefficient different from the coefficient when a ratio of elements nearly equal to the maximum value of the ring of integers Q to the elements $dec_1, \ldots, dec_d$ is equal to or greater than a predetermined value, and the generating comprises generating again the n pieces of second fragment data based on the coefficient set again.

9. A secure computing system comprising:

a secure computing management device; and n computing devices, where n is an integer equal to or greater than two, communicatively coupled to the secure computing management device, wherein the secure computing management device comprises a first processor, each of the n computing devices comprises a second processor, the first processor is configured to set a coefficient selected from a ring of integers Q with X∈Q based on first data X input to the secure computing management device, the first processor is configured to perform secret sharing on the first data X and generate n pieces of first fragment data, each associated with a corresponding one of the n computing devices, from the first data X based on the set coefficient, the second processor in each of the n computing devices is configured to cause a learning model held in the computing device to learn the first fragment data associated with the computing device, the first processor is configured to perform secret sharing on the second data Z and generate n pieces of second fragment data, each associated with a corresponding one of the n computing devices, from second data Z input to the secure computing management device based on the set coefficient, the second processor in each of the n computing devices is configured to perform inference based on the second fragment data associated with the computing device using the learning model held in the computing device, the first processor is configured to obtain decoded data dec by decoding k pieces of inference result data obtained as a result of inference performed by each of k computing devices among the n computing devices, where k is an integer equal to or greater than two and equal to or less than n, and the coefficient is set to make each of the n pieces of first fragment data less than a maximum value of the ring of integers Q, wherein the first processor is configured to set, as the coefficient, a first coefficient $r_1, \ldots, r_{k-1}$ and a second coefficient $P_1, \ldots, P_n$, the first coefficient $r_1, \ldots, r_{k-1}$ corresponding to k−1 random elements of the ring of integers Q, the second coefficient $P_1, \ldots, P_n$ corresponding to n random elements of the ring of integers Q, each associated with a corresponding one of the n computing devices, and generate the n pieces of first fragment data as $W(P_1), \ldots, W(P_n)$ based on a polynomial of degree k−1

$$\Sigma_{i=1}^{k-1} riPi + X$$

with the first data X as an intercept, and the first coefficient and the second coefficient are set to make a maximum value of the n pieces of first fragment data $W(P_1), \ldots, W(P_n)$ less than the maximum value of the ring of integers Q.

10. A secure computing management device communicatively coupled to n computing devices, where n is an integer equal to or greater than two, the secure computing management device comprising:

a processor configured to:

set a coefficient selected from a ring of integers Q with X∈Q based on first data X input to the secure computing management device;

perform secret sharing on the first data X and generate n pieces of first fragment data, each associated with a corresponding one of the n computing devices, from the first data X based on the set coefficient;

transmit each of the n pieces of first fragment data generated to a corresponding one of the n computing devices holding a learning model learning the first fragment data;

perform secret sharing on the second data Z and generate 11 pieces of second fragment data, each associated with a corresponding one of the n computing devices, from second data Z input to the secure computing management device based on the set coefficient;

transmit each of the n pieces of second fragment data generated to a corresponding one of the n computing devices that performs inference based on the second fragment data using the learning model; and obtain decoded data dec by decoding k pieces of inference result data obtained as a result of inference performed by each of k computing devices among the n computing devices, where k is an integer equal to or greater than two and equal to or less than n, wherein the coefficient is set to make each of the n pieces of first fragment data less than a maximum value of the ring of integers Q, wherein the processor is configured to set, as the coefficient, a first coefficient $r_1, \ldots, r_{k-1}$ and a second coefficient $P_1, \ldots, P_n$, the first coefficient $r_1, \ldots, r_{k-1}$ corresponding to k−1 random elements of the ring of integers Q, the second coefficient $P_1, \ldots, P_n$ corresponding to n random elements of the ring of integers Q, each associated with a corresponding one of the n computing devices, and generate the n pieces of first fragment data as $W(P_1), \ldots, W(P_n)$ based on a polynomial of degree k−1

$$\Sigma_{i=1}^{k-1} riPi + X$$

with the first data X as an intercept, and the first coefficient and the second coefficient are set to make a maximum value of the n pieces of first fragment data $W(P_1), \ldots, W(P_n)$ less than the maximum value of the ring of integers Q.

* * * * *